Jan. 11, 1944.  H. H. HOLLY  2,338,939
AUTOMATIC PORTIONING AND MOLDING MECHANISM
Filed March 22, 1941  6 Sheets-Sheet 1

HARRY H. HOLLY
INVENTOR
PER
Alberto Fiihe
ATTORNEY

Jan. 11, 1944.   H. H. HOLLY   2,338,939
AUTOMATIC PORTIONING AND MOLDING MECHANISM
Filed March 22, 1941    6 Sheets-Sheet 2

Fig.3

HARRY H. HOLLY
INVENTOR
PER

*Albert J. Fihe*

ATTORNEY

HARRY H. HOLLY
INVENTOR
PER

ATTORNEY

Jan. 11, 1944.　　　H. H. HOLLY　　　2,338,939
AUTOMATIC PORTIONING AND MOLDING MECHANISM
Filed March 22, 1941　　　6 Sheets-Sheet 6

HARRY H. HOLLY
INVENTOR
PER
Albert G. Fihe
ATTORNEY

Patented Jan. 11, 1944

2,338,939

UNITED STATES PATENT OFFICE 2,338,939

AUTOMATIC PORTIONING AND MOLDING MECHANISM

Harry H. Holly, Chicago, Ill., assignor to Holly Molding Devices, Chicago, Ill., a partnership of Illinois composed of Harry H. Holly and Albert J. Fihe, both of Chicago, Ill.

Application March 22, 1941, Serial No. 384,656

20 Claims. (Cl. 107—15)

This invention relates to improvements in automatic portioning and molding mechanism and has, for one of its principal objects, the provision of means for automatically portioning, shaping, ejecting and stacking molded products, particularly patties of meat or the like, such as are used in the ordinary "hamburger."

This invention comprises improvements over my prior United States Patents Nos. 2,081,455, dated May 25, 1937; 2,224,390, dated December 10, 1940; and my co-pending application for patent on another similar device, Serial No. 316,144, filed January 29, 1940, and issued October 28, 1941, as Patent No. 2,260,780.

One of the important objects of this invention is the provision of an electrically operated patty molding machine, as distinguished from the hand-operated devices of my prior patents and aforesaid application for patent.

Another distinction resides in the fact that, whereas in my prior devices, the amount of meat to be made into a patty was of necessity preliminarily weighed or portioned, usually by hand, the portions in my present invention will be automatically and exactly determined and also automatically fed into the molding part of the apparatus, whereupon they will be flattened and shaped to the desired proportions.

A still further object of the invention resides in providing means whereby the shaped and flattened patties will be each individually positioned upon a separate sheet of paper or the like, and then automatically ejected from the forming device and also automatically stacked or otherwise arranged for convenient further handling, such as storage, quick freezing, or cooking upon a griddle.

It will be evident that the automatic molding device of this invention can equally well be applied for portioning, molding, shaping, ejecting and stacking other materials which may vary greatly from the ground meat used in "hamburgers."

Other and further important objects of the invention will be apparent from the disclosures in the accompanying drawings and following specification.

The invention, in a preferred form, is hereinafter more fully described.

The reference numeral 15 indicates generally the casing of the improved automatic molding mechanism of this invention, this being preferably in the form of a rectangular parallelopipedon, and having removable sides for ready access to the interior for lubrication and the like. These sides are not shown in the drawings.

Inside the casing is a motor 16, which, through a shaft 17, drives a speed-reducing gear in a housing 18, having a transverse shaft 19, upon each end of which is eccentrically mounted a connecting rod 20. The upper end of each connecting rod is attached to a channel-shaped arm 21, pivoted at 22 in the top rear of the casing 15. This arm 21 is of a width slightly less than the width of the casing 15, so as to fit therein, and extends from the rear portion to practically the front thereof.

Figure 1:
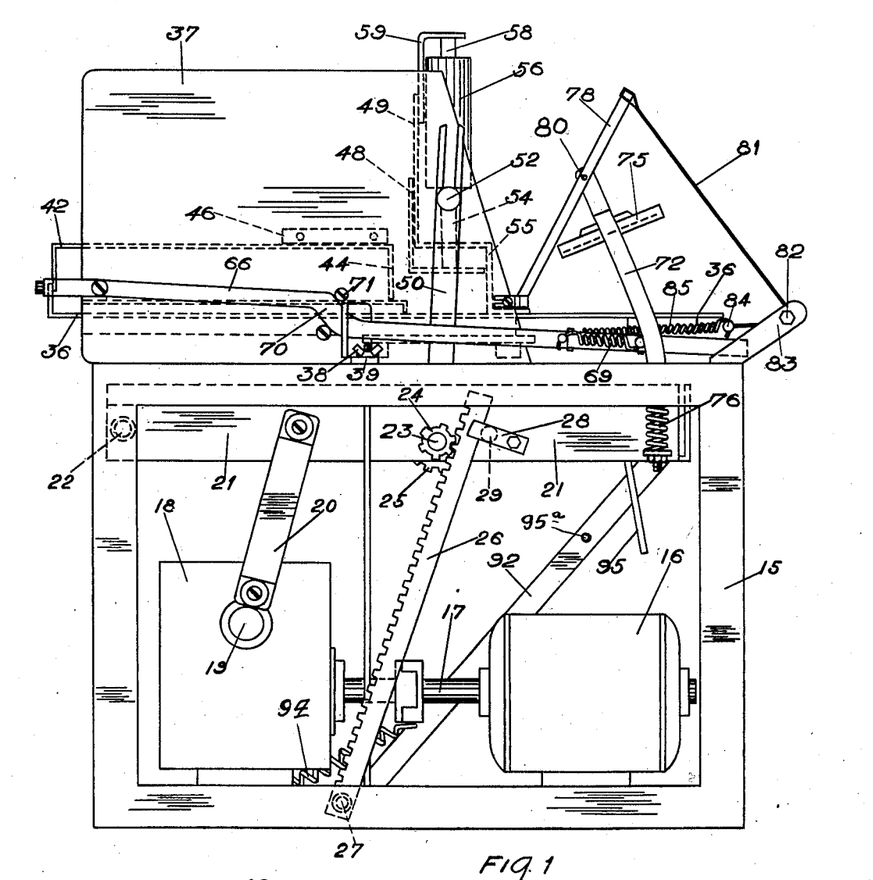
Figure 1 is a side elevation of the improved automatic patty molding mechanism of this invention, parts being removed to show exterior construction and other interior portions being shown in dotted lines.

A shaft 23 is transversely mounted in the channeled arm 21, and upon each outer end of this shaft 23 is mounted a gear 24, these gears being outside the channel faces, as best shown in Figure 1. Also fixed on the shaft 23 and midway between the two gears 24 is a larger gear 25. (Figure 3.)

A pair of opposed cooperating racks 26 is pivotally mounted at 27 in the bottom of the casing 15, one rack being on each side of the casing, and each rack being in mesh with a gear 24. Brackets 28 are affixed on the channel arm 21 to support rollers 29, which operate against the rear faces of the racks 26 to maintain the same at all times in mesh with the gears 24. Reciprocation of the channel arm 21, by operation of the connecting rod 20, will rotate the gears 24 and 25.

Figure 3:
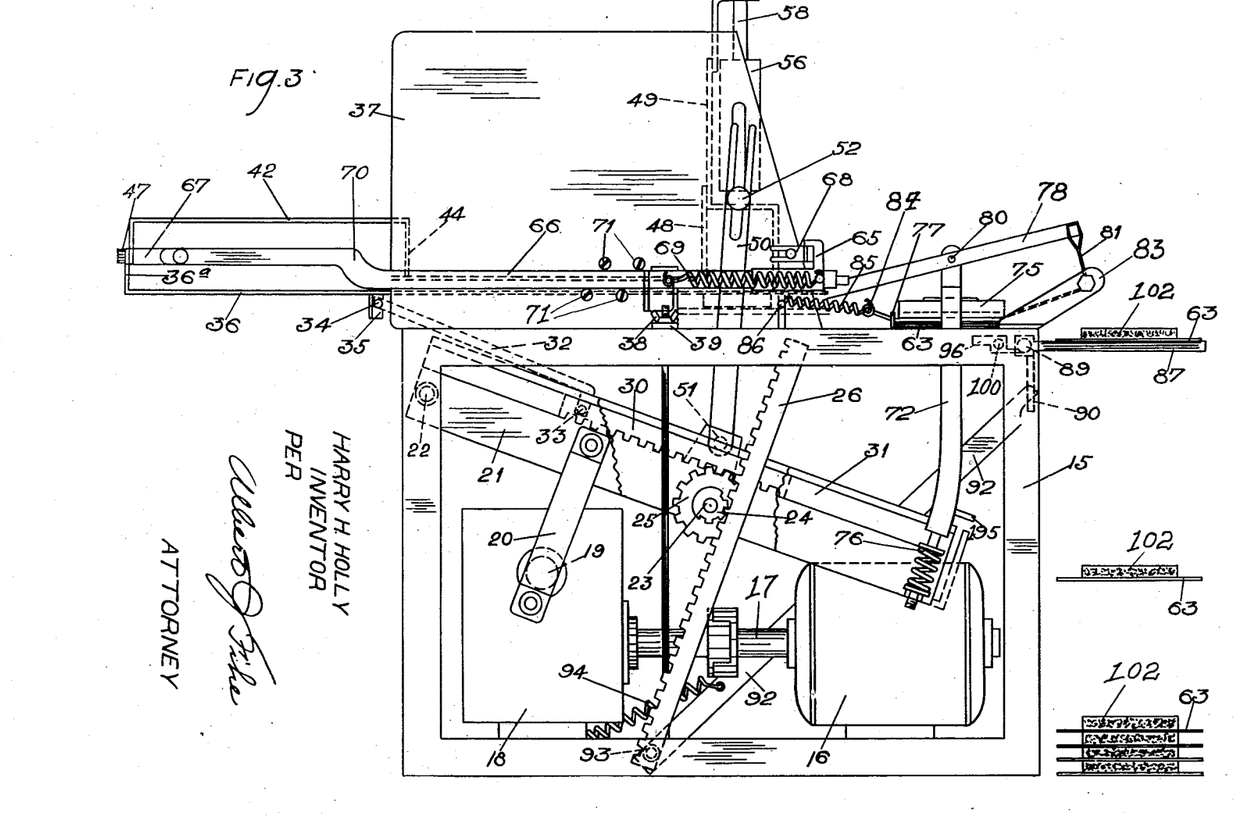
Figure 3 is a side elevation of the apparatus, somewhat similar to Figure 1, but showing the operating parts in a different position, and also illustrating in more detail the action of the patty ejecting and stacking mechanism.

As best shown in Figure 3, the large gear 25, which is fixed on the shaft 23 intermediate the gears 24, is in mesh with a slidable rack 30. This rack is mounted in a suitable grooved channel 31 mounted on the top face of the channeled arm 21, this channel having a slot in its top which extends longitudinally thereof.

Extending upwardly through the slot is a link 32, one end of which is bent downwardly and is pivotally attached to the rear of the rack 30 at 33. The other end of this link extends upwardly through a further slot in the top of the casing 15, and has its rear end pivotally and removably attached at 34 to a depending lug 35, mounted on the lower face of a plate 36.

The plate 36 reciprocates slidably in the bottom of a hopper 37, which hopper is removably mounted on the top of the casing 15, this hopper being preferably also in the shape of a rectangular parallelopipedon, and of a suitable size. Winged nuts 38 on brackets 39 outside the hopper serve to removably fasten the same to the top of the casing 15. This is for ready dismounting for cleaning.

The slide plate 36 is of a length approximately twice the length of the bottom of the hopper 37, so that when the channeled arm 21 is in its downward position, as shown in Figure 3, the slide plate 36, with its appurtenances, extends rearwardly of the hopper 37, while when arm 21 and its associated gears and racks are in their uppermost position, as shown in Figure 1, the rear end of the slide plate 36 is almost flush with the rear face of the hopper 37, but the forward end of this plate projects out of the front end of the hopper and is then almost at the forward edge of the top of the casing 15.

Figure 4:
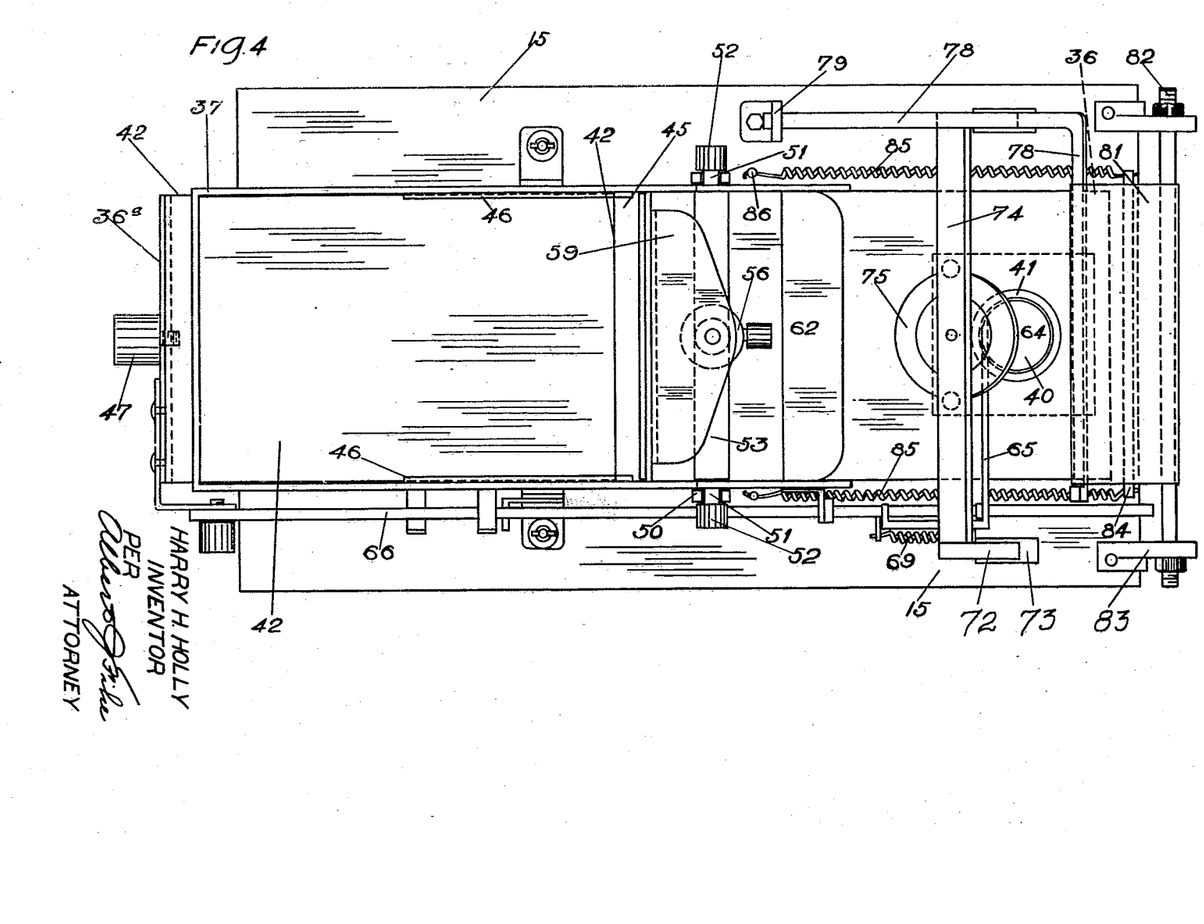
Figure 4 is a top plan view of the portioning and molding device of this invention, showing more particularly the material-receiving hopper at the rear and the patty molding, flattening and ejecting apparatus at the forward portion of the machine.
Figure 5:
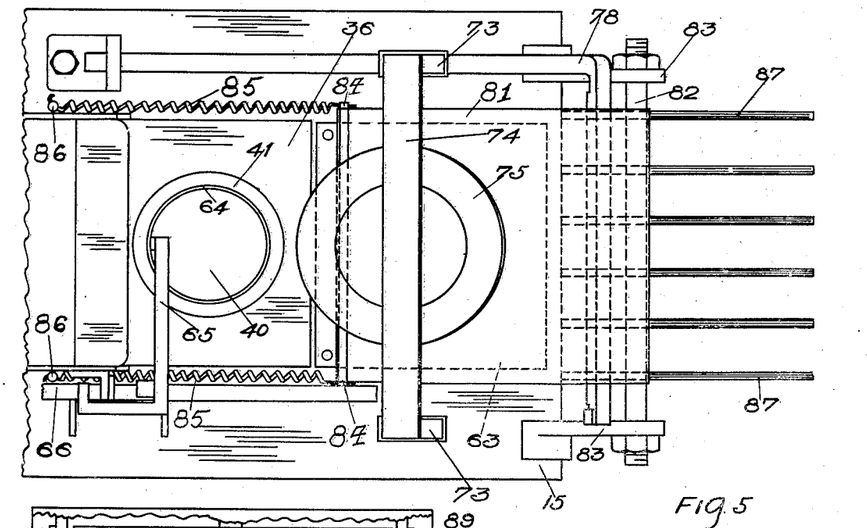
Figure 5 is a detail view of the forward portion of the top of the machine, showing more clearly the action of the patty-forming, ejecting and stacking means.
Figures 8, 9:
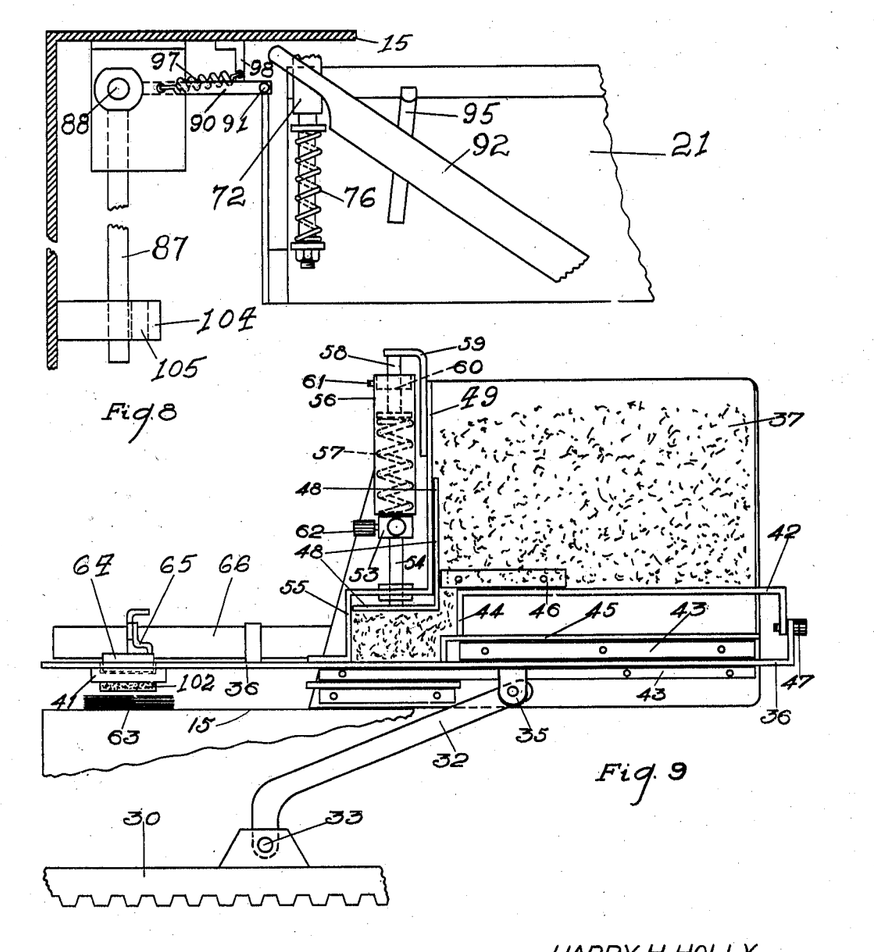
Figure 8 is another view of a portion of the patty stacking means, showing also certain associated parts, whereby this mechanism is operated.
Figure 9 is a detail view of the portioning mechanism, showing the apparatus in a different position from that illustrated in Figure 2 and also showing in more detail the associated parts.
Figure 10:
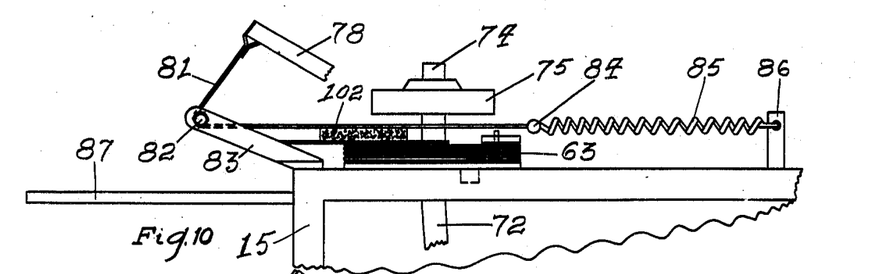
Figure 10 is a detail view, parts being broken away, of the patty forming and shaping means, including the mold and the automatic ejecting and stacking elements. This view also shows the supply of paper sheets, upon each of which an individual, completed patty is deposited.

The slide plate 36 is adapted to move in grooves 43 (Figure 9) formed in the inner faces of the hopper 37, and has an opening 40 in its forward end, this opening being preferably circular, as best shown in Figures 4 and 5. Into this opening is press fitted a ring 41, which is usually of a thickness greater than that of the plate 36, as best shown in Figure 9. This ring determines the size and weight of the patty to be made. Obviously, rings of different sizes and thicknesses may be used, so that patties of different weights and sizes may be made in one machine, simply by changing plates 36 and associated rings 41, or the slide plate itself may be varied in thickness, thereby eliminating the ring 41.

Fastened to the upturned rear edge 36a of the plate 36 is the correspondingly downturned portion of a co-operating plate 42, designated as a feed or pusher plate, and which is arranged in parallel relationship with the slide plate 36, all as best shown in Figures 3 and 9. Plate 42, however, has a downturned forward edge 44, which rides upon an intermediate plate 45 fixed in the hopper 37, and which forms a sort of false bottom for the hopper. The plate 42 is constrained to move in parallel relationship with the plate 36 by means of guides 46, riveted or otherwise fastened to the inner faces of the hopper 37. A screw-threaded bolt 47 removably connects the plates 36 and 42 at the rear.

Figure 2:
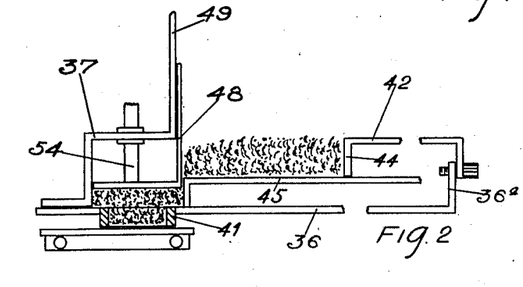
Figure 2 is a detail, parts being omitted, of the automatic portioning mechanism which forms one of the important features of this invention, showing the same in one operating position.

Mounted in the forward end of the hopper 37 and adapted for vertical reciprocation therein is an L-shaped compressor plate 48 as best shown in Figures 1, 2 and 3. The vertical portion of this plate slides against the inner rear face of the front wall 49 of the hopper 37, and this compressor plate 48 is moved upwardly by means of two arms 50, one at each side of the machine and which are pivoted at 51 to the channeled arm 21. These arms 50 are bifurcated at their upper ends leaving slots in which removable pins 51 are positioned (Figure 4). These pins have enlarged knurled heads 52 so that they can be readily removed. The ends of the pins are screw-threadedly fitted into a cross arm 53, and from the center of this cross arm 53 depends a rod 54 which is welded or otherwise fastened to the horizontally extending portion of the L-shaped compressor plate 48. In this manner, reciprocation of the channeled arm 21 will have a tendency to move the L-shaped compressor plate 48 up and down in the forward end of the housing 37 and in the nose thereof which is formed by a projection outlined by the walls 55 (Figure 1).

A cylindrical casing 56 is mounted above the cross arm 53 and housed in this casing is the compression spring 57. A shaft 58 extends through the compression spring in the casing 56, and the casing moves up and down with the compression plate 48, the upper end of the shaft 58 being held in position by means of an overhanging ledge 59 which is fastened to the forward face of the hopper 37. The compression plate 48 is moved upwardly against the tension of the spring 57, this spring being put under compression only when the pins 51 ride into the bottom of the bifurcated slots in the arms 50. As the arms 50 move downwardly, the compression of the spring 57 is practically the only force which then tends to move the compression plate 48 downwardly.

The spring 57 is wholly contained in the casing 56 by means of a cap washer 60 and a set-screw 61, but the casing 56 can be readily removed from its position in front of the hopper by the pulling out of a locking pin 62 (Figure 9) which is mounted in the cross arm 53. The compression of the spring 57 can be adjusted so that a corresponding amount of pressure may be placed on the meat or other material which is forced under the horizontally extending portion of a compression plate 46.

The operation of the portioning mechanism will be apparent from the disclosures in Figures 1, 2, 3 and 9. Material to be molded is placed in the hopper 37, and when the compression plate 48 is in its uppermost position as shown in Figure 9, the pusher plate 42—44 is being moved forwardly so that a certain amount of the material in the hopper is forced into the nose 55 of the hopper beneath the upraised compression plate 48. As the slide plate 36 and the pusher plate 42—44 begins to move rearwardly, the arms 59 move downwardly and the spring 57 comes into play forcing the compression plate 48 downwardly against the meat in the nose 55 of the hopper. As soon as the horizontal portion of the compression plate 48 has moved below the level of the fixed plate 45 in the hopper, the spring 57 acts to compress the meat as best shown in Figure 2. At this instant the slide plate 36 has moved to approximately its rearmost position, and the meat is forced into the opening in the slide plate 36 which may either be outlined by the ring 41 or which may simply be an opening of the desired diameter in the slide plate 36 depending upon the amount of meat or other material which it is desired to portion and eject at one operation. The ring 41 is entirely filled by the action of the compressor plate 48 and the spring 57, and upon the forward movement of the slide plate 36, the measured portion of meat or other material is carried forward by the slide plate 36 into the position shown in Figure 9, at which time the material is immediately above a stack of wax paper sheets 63 positioned on the top of the casing 15.

Means are provided for forcing the measured portion of material out of the ring 41 in the slide plate 36, this means preferably comprising a ring 64 supported by an arm 65 (Figure 5), which arm is moved in unison with the slide plate 36 at the forward portion of its movement by means of a support 66 (Figures 1, 3 and 5) in the form of a rod which extends along one side of the hopper 37 completely to the rear thereof and which is connected at 67 to the slide plate extension 36a. This rod 66 moves in unison with the slide plate 36, and the support 65 is slidably mounted on its forward end. A stop 68 is provided so that the support 65 will stop in front of the forward portion of the hopper, and a spring 69 connects the support 65 to the operating rod 66. The support 65, while allowed to stop in front of the hopper, will always be moved forwardly in unison with the forward end of the slide plate 36 when the slide plate with a portion of material in the opening 40 therein moves out of the nose 55 of the hopper 37. The rod 66 is offset at 70 as shown, and this offset portion is guided between pins 71 so that the forward portion of the rod will be automatically forced downwardly into the position shown in Figure 1 when the slide 36 and the rod 66 reach the end of their forward movement. In this manner, the ring 64 is constrained to move downwardly into the opening 40 in the slide plate 36, thereby pushing the contained portion of meat or other material out of the ring 41 or other opening in the slide plate 36.

It was found necessary to use a ring-like knock-out element 64 to eject the molded material, particularly ground meat, from the opening 40 or ring 41 because a flat knock-out plate would adhere to the meat to such a degree that the meat would not be dropped upon the topmost sheet of paper 63 but would be pulled upwardly against the under-face of the slide plate 36, thereby jamming the action of the machine. It was also found necessary to provide means for sharply stopping the downward movement of the knock-out ring 64 after the measured portion of meat had been pushed out of the ring 41 so that this sharp stopping movement would tend to shake the portion of meat loose from the ring 64 and prevent undesirable non-depositing of the portion.

Mounted at the forward end of the channeled arm 21 is a pair of uprights 72 which uprights extend through openings 73 in the top of the casing 15. Connecting the top of the uprights is a transverse bar 74 which supports a mold plate 75 which as shown is circular but which may be of any other shape.

The uprights 72 are not directly connected to the channel 21 but are slidably mounted in the forward end thereof with helical springs 76 connected with such slidable mounting so that a certain latitude of motion will be allowed so far as the mold plate 75 is concerned when the arm 21 moves downwardly. These springs 76 are comparatively strong so that a sufficient pressure will always be exerted by the mold plate 75 on the portion of meat or other material which has been deposited on the top sheet of paper 63 and which it is desired to flatten and spread so as to conform more nearly in size and shape to the required hamburger patty dimensions.

Quite a number of sheets of paper 63 are adapted to be placed in a removable holder 77 on the top of the machine, and the spring 76 will automatically compensate for variations in thickness due to the removal of individual sheets of paper from the pile 63 as the apparatus is operated.

An L-shaped arm 78 (Figures 1 and 4) is pivotally mounted at 79 on the top of the casing 15 and is also pivotally connected to one of the uprights 72 at 80. One portion of this arm 78 extends transversely across the machine in parallel relationship to the mold head supporting bar 74 but out in front of the same. Positioned on this transversely extending portion of the bar 78 is one end of a mold lining sheet 81 which extends forwardly as best shown in Figure 1 and rides under a transverse bar 82 designated as a stripper bar. This stripper bar is mounted in the supporting brackets 83 and projecting forwardly from the front edge of the casing 15. The other end of the mold lining sheet 81 is mounted on a rod 84 which moves freely over the top of the machine and is held in position only by means of a pair of helical springs 85, the forward end of each of these springs being connected to the rod 84 and the rear end of each spring being fastened to the top of the casing 15 by means of pins or the like 86. Obviously, as the mold head is moved upwardly, the mold lining sheet 81 is pulled upwardly around the stripper bar 82 against the tension of the springs 85, and when the mold head 75 moves downwardly, the springs 85 will pull the mold lining sheet 81 underneath the mold head 75 and above the portion of meat or other material which has just been deposited upon the topmost sheet of paper 63. The action of this repeating mold liner 81 which may be flexible prepared cloth such as oil silk or the like is the same as that described in my Patent No. 2,224,390 heretofore mentioned with the exception that the mold lining sheet in this case is tethered at each end. Upward motion of the mold head 75 after the compressive action on the portion of meat will pull the mold lining sheet 81 forwardly out of from under the mold, and the compressed patty adheres to the under-face of the mold lining sheet sufficiently so that it with one sheet of wax paper adhering to its under-face, will be automatically moved forward from position under the mold and deposited upon the series of prongs or fork-like elements 87 of which six are shown but the number of which can obviously be changed as desired.

These prongs or pins 87 are mounted in a shaft 88 which is positioned inside the forward end of the casing 15 adjacent its upper portion and adapted to turn in bearings 89. A plate 90 is fastened to the cross bar 88 at one side thereof (Figures 6 and 7) and is provided with a projecting pin 91. Adapted to cooperate with this pin 91 is the outer end of an actuating arm 92 (Figure 3) which is pivoted at 93 in the bottom of the casing 15 and normally held in retracted position by means of a spring 94. When the channeled arm 21 moves downwardly, it, by means of a trigger 95, forces the arm 92 downwardly against the pin 91 on the plate 90 which rotates the cross arm 88 through a 90° angle forcing the prongs 87 into a horizontal outwardly extending position as shown in Figures 3, 5 and 7. This position is maintained by means of a latch 96 (Figure 7), one edge of which fits into a notch in the arm 88 and maintains the prongs 87 in horizontal position against the tension of a helical spring 97, one end of which is fastened to a bracket 98 mounted in the under-face of the casing cover 15 and the other end of which spring 97 is fastened to a projection 99 depending from the cross arm 88. The latch 96 is pivoted at 100, and is normally held in position in the notch in the rotatable arm 88 by means of a spring 101. The rear end of the latch 96 projects into the path of an extension 195 which is mounted on the forward end of the channeled arm 21 so that when the channeled arm reaches the upper limit of its movement, the extension 195 contacts the rear end of the pivoted latch 96 moving it upwardly a sufficient distance against the tension of the spring 101 so as to pull the forward end of the latch out from the notch in the rotatable arm 88. Immediately, the spring 97 which has been under tension is free to pull the arm 88 and the prongs 87 around through a 90° angle into the retracted position shown in Figure 8.

In the meantime, a completed molded patty 102 with an attached sheet of waxed paper 63 will have been deposited upon the prongs 87 while in their horizontal position, all as heretofore explained. The quick snap action of a released spring 97 pulls the set of prongs 87 downwardly and out from under the completed patty 102 so quickly that the patty will drop vertically while still remaining in a horizontal position, and several completed patties in succession will then be automatically stacked, all as best shown in Figure 3.

Figure 6:
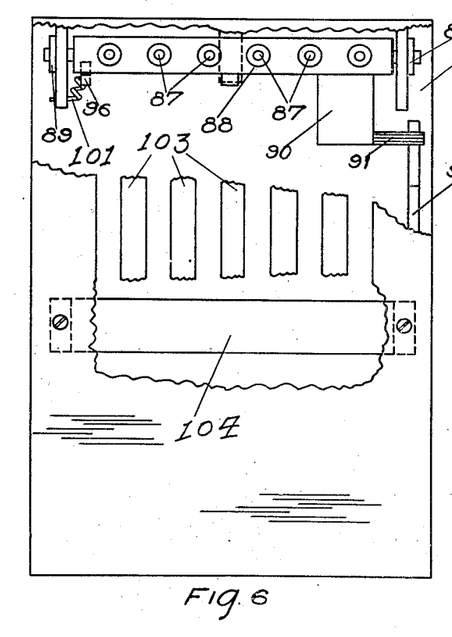
Figure 6 is a front view of the casing of the apparatus of this invention, parts being broken away to show the construction and operation of the automatic patty stacking mechanism.
Figure 7:
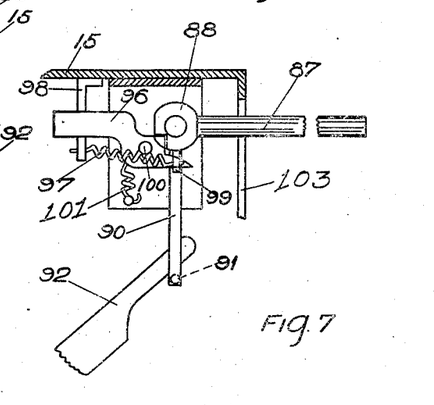
Figure 7 is a detail side view of the operating structure of the patty stacking means of Figure 6.

The bars or prongs forming the forks 87, on their downward motion, move into and through slots 103 cut for this purpose in the front face of the casing 15 as best shown in Figures 6 and 7. A stop is provided in the form of a bar 104 which is fastened to the inner face of the casing behind the lower end of the slots 103 and which is preferably provided with some cushioning means such as a layer of rubber or the like 105 (Figure 8).

Figures 11, 12, 13, 14:
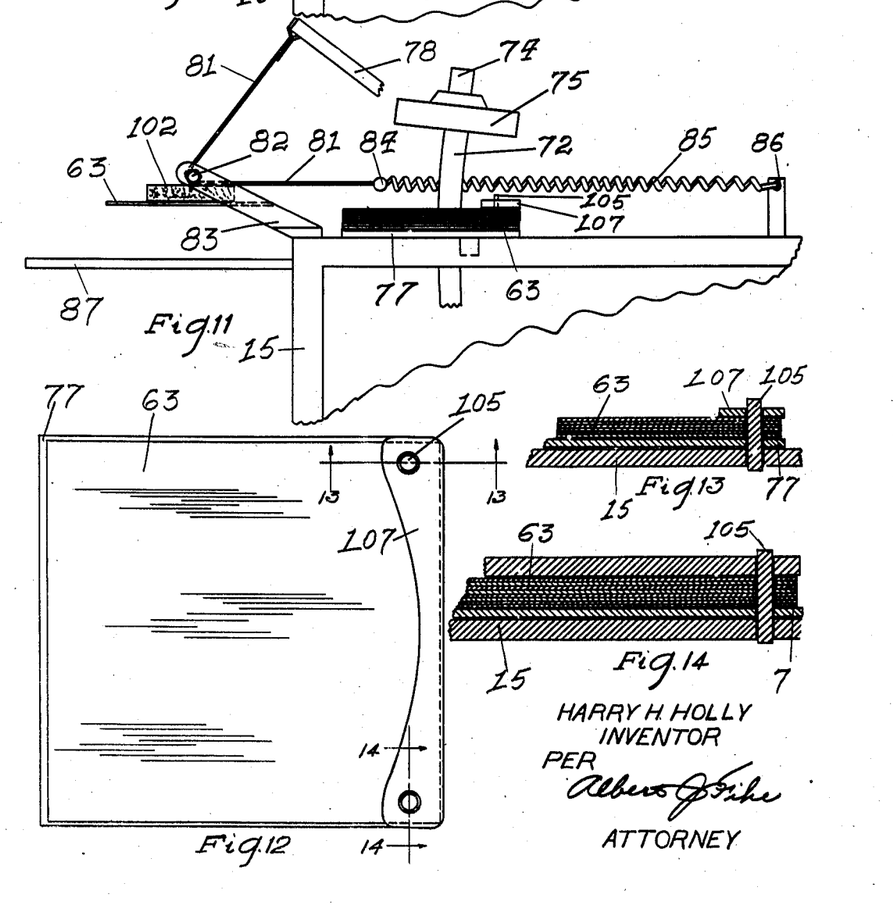
Figure 11 is a view similar to Figure 10, but showing the mechanism in a more advanced position, with a completed patty and its attached sheet of paper about to be deposited upon the stacking means.
Figure 12 is a top plan view of a removable plate for the quick replenishing of stacks of paper sheets, one of which sheets is used under each patty.
Figure 13 is an enlarged sectional view, taken on the line 13—13 of Figure 12.
Figure 14 is a sectional view similar to Figure 13, but showing a slight modification of that portion of the invention.

In Figures 12, 13 and 14 are shown two methods of holding the stacks of paper sheets 63 in position for ready use and for ready replenishing when one pile of sheets becomes exhausted. The sheets are preferably drilled with two openings along one side thereof, and a stack of these previously prepared and drilled sheets is laid on the plate 77, the openings in the sheets being passed over corresponding pins 106 which are fixed in the top of the casing 15 and extend upwardly, the plate 77 having also previously been placed in position over the pins 106. Another plate is then laid on top of the sheets of paper, this being best illustrated at 107 in Figure 12 and shaped so as not to interfere with the mold 75 while, at the same time, lightly holding the sheets in position on the pins and preventing them from riding up over the tops of the pins when the patty is being ejected.

Obviously, other means than that described may be used to reciprocate the slide plate 36 and its associated pusher plate 42, and this means may also, at the same time, raise and lower the mold head 75 through some action other than by the channeled arm 21. The compression plate 48 may also be operated in some other manner, and the spring action need not necessarily be the only compressive means.

For example, a motor in a somewhat larger casing 15 may operate a gear reducer which gear reducer may be positioned underneath the motor and connected thereto by means of a belt and pulleys. The transverse shaft on the speed reducer may have crank arms similar to the connecting rods 29, and these may be connected directly to vertically movable rods which will then reciprocate the mold head 75. The spring take-up for the mold head may be provided by means of a coiled spring fitted in the cross arm 74.

At the same time, the gear reducer connecting rods may reciprocate an arm which can be pivoted at the bottom of the casing, and the upper end of this arm can be connected by means of a link similar to the link 32 to the rear end of the slide 36. The connection between the gear reducer and the slide operating arm may also comprise means for operating the compression plate, and this means may include springs at the lower end thereof, which springs will act to pull the compression plate downwardly and then hold the same in a lowered position for an appreciable length of time whereby a more positive filling of the opening 40 in the slide plate 36 is accomplished.

A flap valve may be provided at the point 44 (Figure 9) so that there will be a positive forward action of the pusher plate 42 but a release of suction through the flap valve when the compression plate 48 is being moved upwardly. The hopper may be made larger and with sloping sides and with some agitating means connected to the pusher plate 42 so that meat or other material in the hopper will be positively impelled into the compression space 55.

The patty stacking means including the forks or prongs 87 may be operated by means of a rack and gear arrangement connected to the uprights which move the mold head, and a more positive action thereby provided. The patty ejecting means 65—66—75 may be changed to include a rod vertically mounted in the casing and projecting through the cover thereof, which rod can be moved upwardly and downwardly in unison with the uprights which move the mold head, and a cam arrangement may be provided whereby the rod is turned about its axis so that the ejecting ring 64 will be moved into position above the opening 40 and at the proper moment for a patty ejecting operation. The automatic repeating mold liner operating element 78 may be constructed in some fashion other than that shown, it being only necessary that the mold liner is moved upwardly in unison with the mold head so that the patty ejecting operation be satisfactorily completed.

A recess may be provided in the cover of the casing 15 directly beneath the mold head, and a supporting plate somewhat similar to the plate 77 may be positioned in this recess for the reception of a plurality of sheets of waxed paper. An arrangement may be provided so that this supporting plate is moved upwardly for a distance approximating the thickness of one sheet of paper for every operation of the mold head whereby the top sheet of paper will always be maintained approximately flush with the top of the casing and variations in thickness of the stack of paper sheets will not occur so far as the molding action is concerned. This automatic upward feed of the stack of paper may comprise a drum-shaped cam which is rotated through, say, one-thousandth part of a revolution for each patty forming operation. A pin or stem fastened to the under face of the plate 77 can ride upon the periphery of this drum-shaped cam so that as the cam is advanced one-thousandth part of its revolution for each operation of the machine, the plate will be pushed upwardly through a distance equal to the thickness of a sheet of paper, thereby providing for the insertion and use of one thousand sheets of paper before the machine must be stopped for paper replenishing purposes. This feed of the drum-shaped cam can be readily accomplished by means of a worm and gear drive in a ration of 50 to 1 operated by a twenty-tooth pawl which is moved one-twentieth of its circumference upon each upward movement of the rods which motivate the mold head 75.

This drum-shaped cam may also include an electric switch whereby the machine is automatically stopped when the paper is exhausted and when the plate 77 which holds the stack of paper sheets drops to the lowest portion of the drum-shaped cam after having ridden over the highest portion of the cam to bring its final sheet up to the level of the top of the casing.

Means may also be provided at the front of the machine whereby after a certain number of patties have been ejected and stacked, such stack will be automatically moved to one side or pushed out of the way so that a new stack may be begun. For example, a turn-table may be provided in front of the machine having one edge directly beneath the prongs 81 and with its center directly in front of the machine on the longitudinal axis thereof. A connection may be provided from the driving means so that after a certain number of patties have been stacked on the turn-table, the table is then quickly turned through a partial revolution so that another stack of patties will pile up alongside the first stack. Any reasonable number of patty stacks may thus be formed on the turn-table so that the operator may accumulate quite a number of stacks before stopping the machine for removal or the stacks may be automatically carried to a point somewhat removed from the machine for handling by an assistant.

The table-turning mechanism may include a pawl having a desired number of teeth, for example, 12, the pawl being turned one-twelfth of its circumference upon each patty ejecting operation. The pawl can be provided with a pin at one point on its circumference, which pin will, in turn, move a lever, which lever will momentarily engage a link with the slide operating means. This link can project forwardly through the front of the machine and be provided with a catch at its outer end which will engage a gear attached centrally of the under-face of the turn-table whereby one operation of the link will move the turn-table through a certain desired angle of revolution.

I am aware that many changes may be made and numerous details of construction varied throughout a wide range without departing from the spirit of the invention, and I, therefore, do not purpose limiting the patent granted hereon otherwise than as necessitated by the prior art.

I claim as my invention:

1. A material measuring and shaping means, comprising means for preliminarily segregating and accurately portioning a quantity of the material, means for depositing said segregated portion upon a receiving and holding means, means for molding and shaping the segregated portion while on the receiving and holding means, and means for ejecting the shaped portion along with its holding means.

2. A material measuring and shaping means, comprising means for preliminarily segregating and accurately portioning a quantity of the material, means for depositing said segregated portion upon a receiving and holding means, means for molding and shaping the segregated portion while on the receiving and holding means, means for ejecting the shaped portion along with its holding means, and means for stacking a plurality of shaped measured portions, with a holding means between successive portions.

3. A machine for automatically measuring ground meat patties, said machine comprising a hopper for the meat, a pusher element reciprocatively mounted in the bottom of the hopper for segregating a portion of the meat in the forward part of the hopper, a slide plate having a hole therein forming a measuring device, a movable compression plate mounted adjacent the forward portion of the hopper for delivering a part of said segregated portion to the measuring device, means for moving said measuring device partly into and partly out of the hopper, means for removing the segregated portion from the measuring device when the same is partly out of the hopper, the pusher plate being moved rearwardly at the same time that the compression plate is moved downwardly, a positive driving means for the pusher plate, and a flexible resilient driving means for the compression plate.

4. An automatic portioning and molding mechanism comprising a hopper, feed means and a reciprocating slide plate for preliminarily measuring a predetermined quantity of material, means for subsequently shaping the measured portion of material, means for delivering said shaped measured portions from the mechanism upon individual packaging elements, said individual packaging elements comprising sheets of paper, the shaping means comprising a reciprocating mold, the ejecting means including a repeating mold liner associated with the mold, and means for finally stacking the measured, shaped and packaged portions, said means including a temporary support for a completed portion with its packaging element.

5. An automatic portioning and molding mechanism comprising a hopper, feed means and a reciprocating slide plate for preliminarily measuring a predetermined quantity of material, means for subsequently shaping the measured portion of material, means for delivering said shaped measured portions from the mechanism upon individual packaging elements, said individual packaging elements comprising sheets of paper, the shaping means comprising a reciprocating mold, the ejecting means including a repeating mold liner associated with the mold, means for finally stacking the measured, shaped and packaged portions, said means including a temporary support for the completed portions with their packaging elements, and means for practically instantaneously removing said temporary support from beneath the completed elements, thereby allowing a vertical drop and a subsequent stacking action.

6. An automatic portioning and molding mechanism comprising a hopper, feed means and a reciprocating slide plate for preliminarily measuring a predetermined quantity of material, means for subsequently shaping the measured portion of material, means for delivering said shaped measured portions from the mechanism upon individual packaging elements, said individual packaging elements comprising sheets of paper, the shaping means comprising a reciprocating mold, the ejecting means including a repeating mold liner associated with the mold, means for finally stacking the measured, shaped and packaged portions, said means including a temporary support for the completed portions with their packaging elements, and means for furnishing an individual packaging element to a portion of material at the moment of shaping.

7. An automatic portioning and molding mechanism, comprising a reciprocating slide having an opening therein, means for depositing a predetermined quantity of material in the opening, and a vertically reciprocating hollow mold for subsequently shaping the measured portion of material.

8. An automatic portioning and molding mechanism, for plastic material, including a reciprocating slide having an opening therein for preliminarily segregating and measuring a desired portion of material, means for moving the slide outwardly from the mechanism, means for ejecting said portion from the slide when in said outward position and depositing said portion upon a packaging sheet, and a reciprocating mold head for shaping the segregated measured portion while on the sheet.

9. An automatic portioning and molding mechanism for plastic material, including a hopper, a feed means in the hopper, a slide having an opening therein reciprocatively mounted below the hopper for receiving a measured portion of the material from the feed means while the opening is beneath the hopper, means for removing said measured portion from the slide when the opening is moved away from the hopper, a mold adjacent the slide for shaping said measured and segregated portion, and means co-operating with the mold for ejecting said shaped, measured and molded portion from the machine.

10. An automatic portioning and molding mechanism for plastic material, including a hopper, feed means for the material mounted in the hopper, a slide plate having an opening therein movable into and out of the lower portion of the hopper, the opening in the slide plate adapted for preliminarily receiving from the feed means a measured and segregated portion of material, means co-operating with the slide plate for further shaping the measured, segregated portion, and means for ejecting and stacking the shaped, measured portion.

11. A machine for automatically measuring and shaping plastic material, said machine comprising a hopper for the material, feeding and segregating means in the hopper, a measuring device in the lower part of the hopper adjacent the feed and segregating means, means for delivering a part of said segregated material to the measuring device to fill the same at each operation, means for moving said measuring device into and out of the hopper, means for removing the segregated portion from the measuring device when the same is out of the hopper, and means for shaping the portion when removed from the measuring device, said shaping means operating when the measuring device is back in the hopper.

12. A machine for automatically measuring plastic material, said machine comprising a hopper for the material, a pusher plate for segregating the portion of material in the forward part of the hopper, a measuring device in the lower portion of the hopper, said measuring device having an opening therein, a compression plate adjacent the forward portion of the hopper for delivering a part of said segregated portion to the measuring device, means for moving said measuring device into and out of the hopper, and an ejector arranged above the slide for ejecting the measured material from the opening when said opening is out of the hopper.

13. A machine for automatically measuring plastic material, said machine comprising a hopper for the material, a pusher plate reciprocatively mounted in the bottom of the hopper for segregating a portion of the material in the forward part of the hopper, a measuring element forming part of the hopper, a compression plate mounted in the forward lower portion of the hopper adjacent the measuring device for delivering a part of said segregated portion to the measuring device under pressure, means for moving said measuring device into and out of the hopper, and means for removing the segregated portion from the measuring device when the same is out of the hopper, the pusher plate being moved rearwardly at the same time that the compression plate is moved downwardly.

14. A machine for automatically measuring and shaping plastic material, said machine comprising a hopper for the material, a pusher plate reciprocatively mounted in the bottom of the hopper for segregating a portion of the material in the forward part of the hopper, a measuring device, a compression plate mounted adjacent the forward portion of the hopper for delivering a part of said segregated portion of material to the measuring device, means for moving said measuring device into and out of the hopper, means for ejecting the segregated portion from the measuring device when the same is partially out of the hopper, the pusher plate being moved rearwardly at the same time that the compression plate is moved downwardly, said measuring device having an opening therethrough for receiving a portion of the material under pressure when the compression plate is moved downwardly, and means for shaping the ejected measured portion.

15. A machine for automatically measuring and shaping plastic material, said machine comprising a hopper for the material, feed means in the hopper and further means in the hopper adjacent the feed means for segregating a portion of the material in the lower part of the hopper, a measuring device comprising a slide plate having an opening therein, that part of the slide plate having the opening therein being movable into and out of the hopper, means for reciprocating said measuring device with respect to the hopper, an ejector arranged above the measuring device for ejecting the measured material from the opening when said opening is out of the hopper, means for supporting a plurality of packaging sheets in the machine adjacent the ejector, said ejector acting to deposit each measured and segregated portion of material upon a packaging sheet at each operation, and means for removing such measured ejected portion with its packaging sheet upon each reciprocation of the measuring device.

16. An automatic portioning and molding mechanism comprising a hopper, feed means and a slide plate for preliminarily measuring and partially shaping a predetermined quantity of meat, an ejector co-operating with the slide plate for ejecting the measured meat therefrom at regular intervals, means for subsequently finally shaping the measured portion of meat, means for supporting a stack of individual packaging sheets below the shaping means, and means co-operating with the shaping means for delivering said shaped measured portions of meat from the mechanism, each upon an individual packaging sheet.

17. An automatic portioning and molding mechanism comprising a hopper, feed means and a slide plate for preliminarily measuring and partially shaping a predetermined quantity of meat, an ejector co-operating with the slide plate for ejecting the measured meat therefrom at regular intervals, means for subsequently finally shaping the measured portion of meat, means for supporting a stack of individual packaging sheets below the shaping means, and means co-operating with the shaping means for delivering said shaped measured portions of meat from the mechanism, each upon an individual packaging sheet, said removing means comprising a flexible sheet resiliently supported adjacent the molding means.

18. An automatic portioning and molding mechanism comprising a hopper, feed means and a slide plate for preliminarily measuring and partially shaping a predetermined quantity of meat, an ejector co-operating with the slide plate for ejecting the measured meat therefrom at regular intervals, means for subsequently finally shaping the measured portion of meat, means for supporting a stack of individual packaging sheets below the shaping means, and means co-operating with the shaping means for delivering said shaped measured portions of meat from the mechanism, each upon an individual packaging sheet, said removing means comprising a flexible sheet resiliently supported adjacent the molding means, and means for moving said flexible sheet into and out of position beneath the molding means and between the mold and the meat portion upon each molding operation.

19. An automatic portioning and molding mechanism comprising a hopper, feed means and a slide plate for preliminarily measuring and partially shaping a predetermined quantity of meat, an ejector co-operating with the slide plate for ejecting the measured meat therefrom at regular intervals, means for subsequently finally shaping the measured portion of meat, means for supporting a stack of individual packaging sheets below the shaping means, and means co-operating with the shaping means for delivering said shaped measured portions of meat from the mechanism, each upon an individual packaging sheet, said removing means comprising a flexible sheet resiliently supported adjacent the molding means, and means for moving said flexible sheet into and out of position beneath the molding means and between the mold and the meat portion upon each molding operation, and a stacking mechanism operating in conjunction with the mold means, the ejecting means and the measuring means for stacking the ejected, measured, molded portions of meat, each upon an individual packaging sheet of paper.

20. An automatic meat portioning and molding mechanism comprising a hopper, feed means and a slide plate reciprocatively mounted in the hopper, all of said means co-operating for preliminarily measuring and shaping a predetermined quantity of meat, an ejector means arranged above the slide plate for ejecting said measured quantity of meat from the slide plate at each reciprocation thereof, means for supporting a stack of individual packaging sheets beneath the slide plate and in alignment with the ejector means, a final shaping means for the meat, comprising a reciprocating mold operating in conjunction with the slide plate and the ejector, a flexible sheet resiliently mounted on the machine to move into and out of position beneath the mold for ejecting the shaped and packaged portions from beneath the mold at each reciprocation of the mold in the slide plate, and a stacking means at the forward end of the machine beyond the supported sheets of paper for receiving and stacking the ejected meat patties, each upon an individual packaging sheet, said stacking means receiving each ejected patty from the ejecting means and momentarily supporting the same for a stacking operation.

HARRY H. HOLLY.